United States Patent [19]

Rudish et al.

[11] Patent Number: 5,179,386
[45] Date of Patent: Jan. 12, 1993

[54] CYLINDRICAL PHASED ARRAY ANTENNA SYSTEM TO PRODUCE WIDE OPEN COVERAGE OF A WIDE ANGULAR SECTOR WITH HIGH DIRECTIVE GAIN AND STRONG CAPABILITY TO RESOLVE MULTIPLE SIGNALS

[76] Inventors: Ronald M. Rudish, 50 Bethany Dr., Commack, N.Y. 11725; Scott F. Hall, 75 Lent Dr., Plainview, N.Y. 11803

[21] Appl. No.: 899,629

[22] Filed: Aug. 21, 1986

[51] Int. Cl.[5] .............................. H01Q 3/22
[52] U.S. Cl. .................................. 342/371; 342/373
[58] Field of Search ................ 342/371, 373, 382, 375

[56] References Cited
U.S. PATENT DOCUMENTS

| | | | |
|---|---|---|---|
| 4,316,192 | 2/1982 | Acoraci | 342/373 |
| 4,414,550 | 11/1983 | Tresselt | 342/373 |
| 4,652,879 | 3/1987 | Rudish et al. | 342/371 |

Primary Examiner—David Cain
Attorney, Agent, or Firm—Oldham, Oldham & Wilson Co.

[57] ABSTRACT

A cylindrical phased array antenna system capable of scanning at rates faster than the information rate of signals being received so that no information is lost by the scanning process. The array is configured to add the capability to provide multi-dimensional separation of multiple signals and to eliminate the sensitivity loss due to sampling. The cylindrical phased array is comprised of the means to decompose the distribution of current on the radiator elements caused by wave incidence into component signals which are the Fourier spatial harmonics of the distribution, heterodyne means to differentially phase shift these component signals at rates exceeding $4\pi$ radians per cycle of the highest frequency present in the information content of the incident wave, and means to form multiple complex-weighted sums of the component signals.

3 Claims, 2 Drawing Sheets

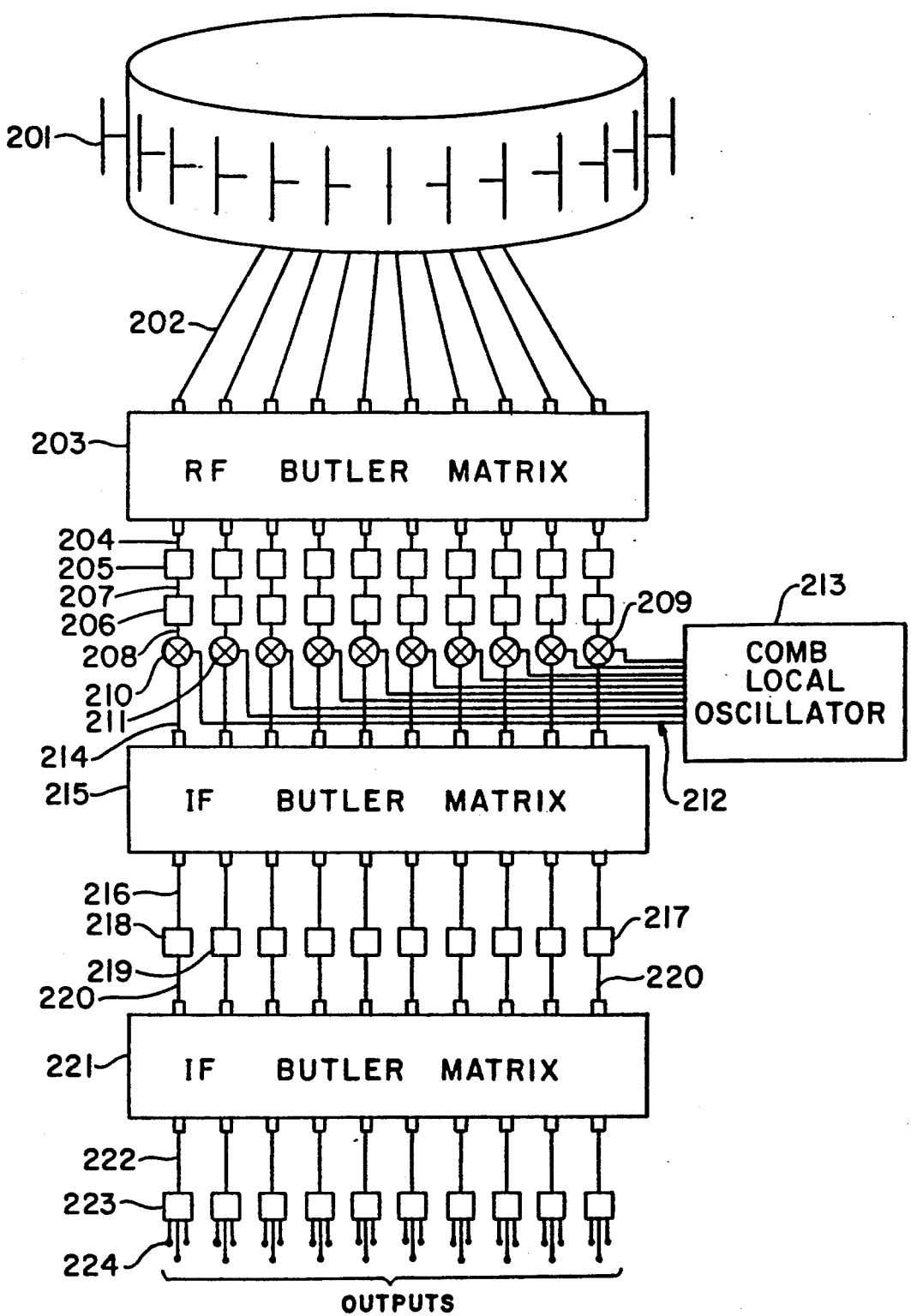

CYLINDRICAL PHASED ARRAY ANTENNA SYSTEM TO PRODUCE WIDE OPEN COVERAGE OF A WIDE ANGULAR SECTOR WITH HIGH DIRECTIVE GAIN AND STRONG CAPABILITY TO RESOLVE MULTIPLE SIGNALS

TECHNICAL FIELD

This invention relates to cylindrical electronically scanned antenna systems which scan at rates faster than the information being processed so that no information is lost by the scanning process, and more particularly to improvements in the array configuration to add the capability to provide multi-dimensional separation of multiple signals and to eliminate the sensitivity loss due to sampling.

BACKGROUND ART

It is sometimes desirable to configure a system to receive all of the electromagnetic signals within the receiver's capabilities as limited by its sensitivity and bandwidth. Signals of interest are usually incident from widely diverse directions. Therefore, prior systems have utilized antennas having a wide azimuth beam width such as omnidirectional antennas as the system's receptor.

A severe limitation of this approach is that it does not permit directional resolution of multiple signals. Such resolution is usually desirable to prevent garbling of signals that cannot otherwise be resolved in frequency or time-of-occurrence. Directional resolution is also desirable in cases where the direction of incidence of the signals is to be estimated.

To overcome these disadvantages, alternative prior art systems have been configured using narrow-beam antennas. In one case, multiple antennas, each producing a narrow beam, are arranged in a circular pattern so that their beams are contiguous and point radially outward. In another case, a single cylindrical array antenna is configured to form multiple beams which are contiguous and point radially outward. In both cases, each beam port of the antenna(s) is connected to a separate receiver, thus the system can exhibit the advantages of both good directional resolution and complete, simultaneous directional coverage. However, the disadvantage in this case is the high cost of the multiple receivers.

Another class of prior art systems attempts to achieve omnidirectional coverage with a single narrow beam by scanning that beam as a function of time. In these systems, a narrow beam is scanned over all azimuths by mechanical rotation of a fixed-beam antenna, or by electronic scan of a cylindrical array antenna. The disadvantage in this case is that the beam cannot look everywhere at once. This is especially a problem for multiple signals from diverse directions if they are non-repetitive in character or have rapidly changing wave forms (high information rate or short-pulse signals). These high information rate signals may not be sampled at sufficient rate by the scanning beam to prevent information loss.

More recently, techniques have been disclosed which address the problems associated with directional resolution of multiple signals. A recent disclosure, U.S. Ser. No. 719,460, provided a cylindrical array antenna system capable of scanning a narrow beam through its complete coverage sector at a rate at least twice as fast as the maximum information rate of the signals it receives so that no information is lost. This allows the system to scan within the time period of the shortest pulse which it is expected to receive and thereby have a high probability of intercepting and receiving that signal. This system provided angular resolution of multiple signals and the capabilities of determining their direction of arrival commensurate with the narrow beam widths of a full N element cylindrical array. The system provided the same sensitivity and angular resolution regardless of the direction of signal incidence. These improvements were the result of using heterodyne techniques to achieve very rapid scanning of a single beam throughout the antenna's entire sector of coverage.

This technique, however, does result in a sensitivity loss due to sampling. This loss occurs because the scanning beam is only directed at the angle of incidence for a short period of time during a scan. The scanning beam will intercept the incident signal for only 1/Nth of the scanning period. The sampling loss in db is given by 10 log N. This degrades the sensitivity to that of a single element of the array or less.

A recent invention, pending application Ser. No. 807,871 filed Oct. 20, 1985 is an improvement over pending application Ser. No. 719,460 referenced above in that the more recent invention creates multiple scanning beams which are used to eliminate the sampling loss of the prior invention. It is in contrast to Ser. No. 519,261 filed Aug. 1, 1983 which is directed to linear arrays.

The instant invention is an improvement over pending Ser. No. 807,871 in that it results in a narrow bandwidth channelization of signals in accordance with their frequency without requiring the use of narrow band filters. It is directed toward cylindrical arrays in contrast to Ser. No. 700,115, filed Feb. 11, 1985 which is directed to linear arrays.

BRIEF DESCRIPTION OF THE DRAWINGS

For a better understanding of the invention, reference should be made to the drawings wherein:

FIG. 2 is a block diagram of a cylindrical phased array antenna and receiver front-end illustrating the present invention.

PRIOR ART TECHNIQUE

Figure 1:
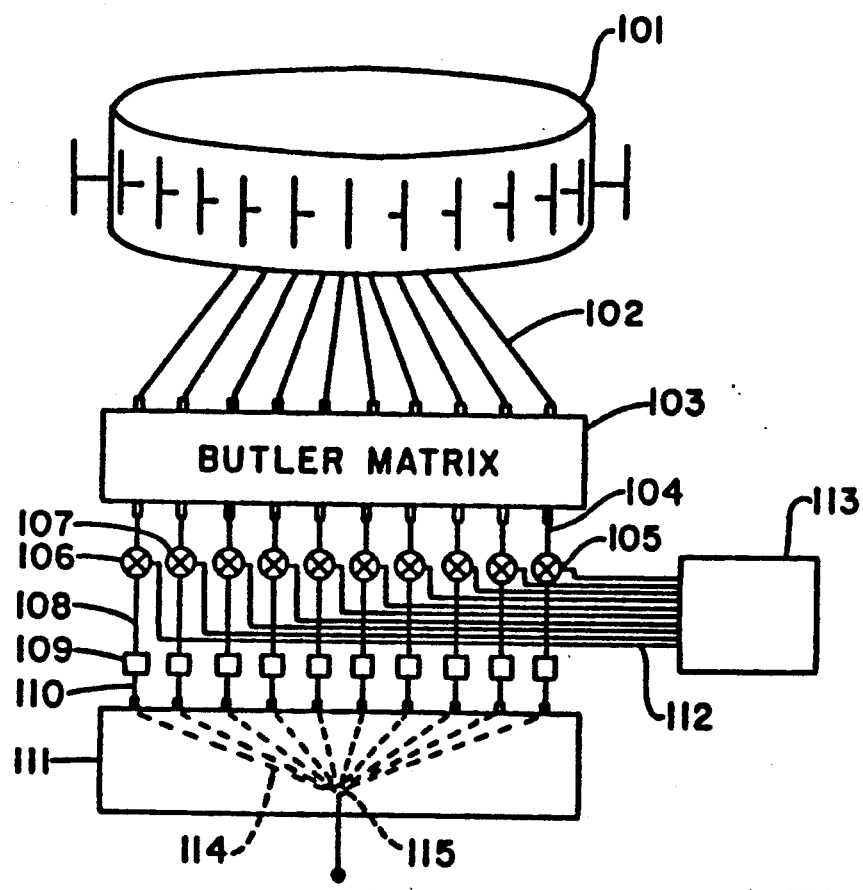
FIG. 1 is a block diagram of a cylindrical phased array antenna illustrating a prior art system.

The principles of a cylindrical phased array antenna system using a rapid-scan heterodyne technique is illustrated in FIG. 1. The diagram of FIG. 1 comprises a cylindrical array of N antenna elements 101, N equal length transmission lines 102 which connect elements 101 to the N input ports of a Butler matrix 103, N equal length transmission lines 104 which connect to N output ports of the Butler matrix 103 with a set of N heterodyne mixers 105, end mixer 106 and adjacent mixer 107, N equal length transmission lines 108 which connect the mixers 105 to a set of N fixed IF phase shifters 109, N equal length transmission lines 110 which connect the fixed phase shifters 109 to the N input ports of a signal combiner 111, and N equal length transmission lines 112 which connect mixers 105 with a comb oscillator 113.

The signal combiner 111 consists of N equal length transmission lines 114 which meet at summing junction 115. If the intermediate frequency is in the UHF or microwave region, the transmission lines may incorporate appropriate changes in characteristic impedance level near their junction end to implement the transforming action necessary for impedance matching the junction and the resistors necessary to isolate the junction (as is standard practice with isolated N-way combiners at microwave frequencies).

The comb oscillator 113 generates a set of coherently related local oscillator (LO) signals which differ in frequency by integer multiples of a constant frequency offset. The LO signals are coherent in the sense that once every cycle of the offset frequency, all of the LO signals reach the peak of their positive half cycles simultaneously. Assuming that the offset frequency is denoted $\Delta f$ and that the base LO frequency is $f_{LO}$ then, the first LO signal would be at frequency $f_{LO}+\Delta f$, and the Nth LO signal would be at frequency $f_{LO}+N\Delta f$. The first LO signal is applied to the first of the transmission lines 112 leading to end mixer 106, the second LO signal is applied to the second of these transmission lines (to adjacent mixer 107) and so on. Because of the progressive frequency difference of the LO signals on these transmission lines, the signals exhibit an effective phase advance of the time of occurrence of their sinusoidal peaks; at a time, t measured from the time of simultaneous peaking (reference time), this effective phase advance has the value $\psi_{LO}=2\pi\Delta ft$ for the signal on the second of transmission lines 112, relative to the signal on the first of transmission lines 112, a value of $4\pi\Delta ft$ for the signal on the third transmission lines 112 and a value of $(N-1)2\pi\Delta ft$ for the signal on the Nth of the transmission lines 112.

For the purposes of illustrating the operation of the arrangement in FIG. 1, assume that a pulsed signal wavefront is incident from the direction $\phi=0$ (reference direction). This induces RF signals in the antenna elements 101 and these are divided and recombined in N different ways by the Butler matrix 103. These N recombined signals appear at the Butler matrix outputs and are applied to the RF signal ports of the mixers 105. These signals represent the N+1 circular modes (the Fourier spatial harmonics of an equivalent continuous current distribution along the aperture; the $-N/2$ and $+N/2$ mode pair are identical and are output at the same Butler matrix port). At the instant of time $t=0$, and periodically once every cycle of the offset frequency thereafter, all the local oscillator LO signals peak simultaneously (are effectively in phase at those instances). Thus at these instances, the LO signals and mixers do not impart any relative phase changes to the IF signals so that they have the same effective phase relationships as the RF signals. The fixed phase shifters 109 have values which are chosen to complement the values of the phases of the IF signals at these instances so that all of the IF signals output from the set of fixed phase shifters peak simultaneously. The momentarily in-phase IF signals are coherently summed by power combiner 111 so that a composite signal proportional to the algebraic sum of their individual voltages is presented at the power combiner output. At other instances of time within a $1/\Delta f$ period, the IF signals will leave the mixers with an additional progressive linear phase advance imparted by the LO signals and mixers. Thus, they will be in states of partial or complete destructive interference as they are summed by power combiner 111 and therefore the composite signal presented at the power combiner output will be less than its peak value. In summary, the signal incident from direction $\phi=0$ causes the IF signal output by power combiner 111 to peak periodically at $t=0$, $1/\Delta f$, $2/\Delta f$, etc.

Now consider the case where the signal incidence direction is rotated so that $\phi>0$. It can be shown that this causes the set of RF outputs from Butler matrix 103 to suffer an additional linear progressive phase retardation (adjacent phases differing by an additional $\phi$ radian). At an observation time, $t_o$ such that the effective progressive phase advance of the LO signals, $\psi_{LO}$, is equal to this additional progressive phase retardation of the RF signals output by the Butler matrix, the IF signals applied to the power combiner 111 will all peak simultaneously (in phase at that instant). This instant of time, $t_o$ is given by:

$$t_o = \frac{\phi}{2\pi} \cdot \frac{1}{\Delta f}$$

At the other observation times within a $1/\Delta f$ period, the IF signals applied to the combiner will be in various states of partial or complete destructive interference. In summary, the signal incident from direction $\phi$ causes the composite IF signal output by the power combiner 111 to peak periodically at $t=t_o$, $t_o+1/\Delta f$, $t_o+2/\Delta f$, etc.

An emitter located at $2\pi/N$ beyond 0 will cause an output which peaks $1/N\Delta f$ later than the output from the emitter at direction $\phi$. In effect, the array scans its beam of sensitivity in azimuth at a rate equal to $\Delta f$. Since $1/\Delta f$ can easily be made a shorter time interval than the duration of the shortest emitter pulse expected, the array will always scan within that pulse and have 100 percent probability of intercepting it. Also, measurement of the time of peaking, $t_o$, for each signal will yield the azimuth direction of the signal. It may be noted that the scanning action causes the composite IF signals to vary with time in the same manner that the antenna beam pattern varies with azimuth angle. Since the antenna beamwidth is approximately equal to $2\pi/N$, the duration of the IF signal output will be approximately $1/N\Delta f$. This period is at least $1/N$ shorter than the duration of the shortest emitter pulse expected so that the post IF processor must be capable of handling signals with this expanded bandwidth. Of greater importance is the fact that two emitters located a beamwidth or more apart will cause two distinct pulses, separable in time, to be output from power combiner 111, even if the emitter pulses arrive at the antenna simultaneously. Thus, the full angular resolution of the array is established, although angular resolution has gone through a transformation so that it is now manifest as resolution in the time domain.

The problem with this approach is that it suffers a sampling loss which degrades sensitivity. This loss is caused by the fact that the scanning beam intercepts the incident signal for only 1 Nth of the scanning period. The sampling loss in dB is given by 10 log N.

BEST MODE FOR CARRYING OUT THE INVENTION

To clearly illustrate the various novel aspects of the present invention, a specific example is taken in which an N element cylindrical array incorporating the preferred embodiment of this invention is exposed to a pulsed signal wavefront. The preferred embodiment is shown in FIG. 2. The diagram of FIG. 2 consists of a cylindrical array of N antenna elements, 201, N equal length transmission lines 202 which connect elements 201 to the N input ports of an RF Butler matrix 203. N equal length transmission lines 204 connect the N output ports of the Butler matrix 203 to N fixed delays for focus 205. Another set of N equal length transmission lines 207 connect the N fixed delays 205 to N differential amplitude weights 206; still another set of N equal length transmission lines 208 connect the set of fixed delays 205 with a set of N heterodyne mixers 209, with end mixer 210 and adjacent mixer 211. N equal length transmission lines 212 connect the N mixers 205 to a comb local oscillator 213. The output ports of the mixers 205 are connected by N equal length transmission lines 214 to the N input ports of intermediate frequency (IF) Butler matrix 215. N equal length transmission lines 216 are used to connect the N output ports of the multiple beam-forming device 215 to a set of N fixed delays 217 of progressively differing length, with end delay 218 and adjacent delay 219. The outputs of the fixed delays 217 are connected by N equal length transmission lines 220 to the N input ports of a second IF Butler matrix 221. N equal length transmission lines 222 connect the second IF Butler matrix 221 outputs with N coarse channelization filters 223, each channelization filter having K output ports 224. Amplifiers could be inserted before and after the mixers in a practical implementation, but they have been omitted from FIG. 2 because their presence is not required for the purpose of explaining the approach.

Figure 3:
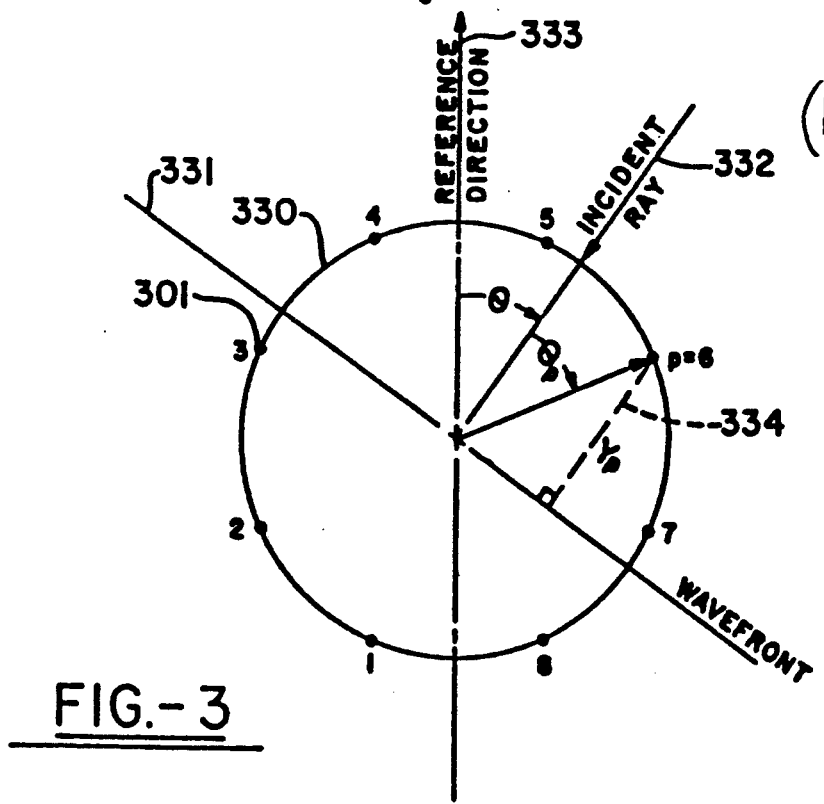
FIG. 3 is a schematic diagram of the aperture of the cylindrical phased array antenna of FIG. 2 defining angles and directions.

FIG. 3, a schematic defining angles and directions, is useful in illustrating the operation of the arrangement in FIG. 2. For such illustrative purposes, assume initially that the N elements 301 have omnidirectional radiation response patterns (simplifies explanation) and are arranged in a circle 330 of radius R. Assume further that a signal wavefront 331 at radian frequency $\omega_s$ (wavelength $\lambda_s$) is incident from the direction $\theta$. This direction is defined as the angle between the incident ray 332 (a perpendicular to the wavefront) and a reference direction line 333 which is fixed relative to the set of elements 301. Each element of the set 301 is consecutively numbered, starting with the element on the left side of and closest to the rearward extension of the reference direction line 333 and proceeding in a clockwise direction. Thus, the element on the left side and closest to the rearward extension of line 333 is numbered 1, that on the right side and closest to the rearward extension of line 333 is numbered N, and a generally chosen element is numbered $p$. The angle that the incident-signal ray 332 makes with a radius extending through element $p$ is given by $\theta_p$ where:

$$\theta_p = (p - \bar{n})2\pi/N - \theta$$

and $$\bar{n} = (N+1)/2$$

The signals received by each element are advanced differentially relative to that which would have been received by an element at the center of the array (the phase and time reference point) by an amount proportional to the distance 334, whose magnitude is given by $Y_p$ where:

$$Y_p = R \cos \theta_p$$

Thus the signal received by the $p$th element, $e_p$, experiences a phase shift proportional to $Y_p$. Thus $e_p$ can be expressed as:

$$e_p = \exp j(\omega_s t + r \cos \theta_p)$$

where $r = 2\pi R/\lambda_s$, and t = time

Referring once again to FIG. 2, the signals, $e_p$ received by elements 201 are applied to RF Butler matrix 203. This Butler matrix divides the signal at its $p$th input into N equal parts, phase shifts each by an amount, $\phi_{pn}$, and combines each with signals which originated from other input ports to form the sum $e_n$ at its nth output. This sum, $e_n$, represents the (N−A)th circular mode output (Fourier spatial harmonic) referenced in the discussion of prior art. The phase shift $\phi_{pn}$ is dependent on both $p$ and n and is given by:

$$\phi_{pn} = (p - \bar{n})(n - A)(2\pi/N)$$

where A = any integer (or zero), and $\phi_{pn}$ is modulo $2\pi$. Thus, the output voltage, $e_n$, is the summation:

$$e_n = \frac{1}{\sqrt{N}} \sum_{p=1}^{p=N} \exp j[\omega_s t + r\cos\theta_p + (p - \bar{n})(n - A)(2\pi/N)]$$

where the N factor accounts for the N-way power division. It can be shown that the summation equates to the form:

$$e_n = \sqrt{N} \exp(j\omega_s t) \sum_{q=-\infty}^{\infty} J_u(r) \exp\left(-ju\left(\theta - \frac{\pi}{2}\right)\right)$$

for $u = qN - (n - A)$ and $J_u(r)$ is the Bessel Function of order u and argument r.

In most practical applications, N will be at least 8, and more typically will be chosen as the binary number 16 or 32. Also, for convenience, A will usually be chosen as equal to N/2. Under these conditions, the summation can be approximated by the q = 0 term so that $e_n$ can be approximated by:

$$e_n \approx \sqrt{N} J(r) \exp j[\omega_s t - (N/2 - n)(\theta - \pi/2)]$$
$$(N/2 - n)$$

Thus the outputs of RF Butler matrix 203, $e_n$, are signals with phase linearly dependent on $(N/2 - n)\theta$.

It is of interest to compare this phase angle expression to that for the signal received by the nth element of a hypothetical, N-element linear array in which the phase reference is taken as the signal received by the element n = N/2. In this hypothetical case, the received signal has a phase which is $(N/2 - n)\beta$, where $\beta$ is given by $(2\pi d/\lambda_s) \sin \theta'$, d is the inter-element spacing and $\theta'$ is the angle that the incident signal ray makes with the normal to the array axis. This similarity of form for phase angle expression has led to the common practice in the prior art of calling the Butler Matrix a circular array linearizer, and to the common practice of processing the outputs of the Butler matrix, $e_n$ as if they had come from the elements of a linear array. Indeed, the Butler matrix is a real-time discrete Fourier transformer and the process of obtaining outputs corresponding to Fourier spatial harmonics of the current distribution on the circular array has been called by the prior art, the process of linearizing the array.

This linear array equivalence is an approximation because of the approximation in equating the summation in the expression for $e_n$ to just its principal term. The approximation is excellent for most values of n; however, a second term specified by $q = -1$ or $q = +1$ is of comparable magnitude for $n=1$ and $n=N$, respectively. Nevertheless, in most practical applications, the signals $e_n$ for n near unity and n near N are intentionally attenuated relative to those for intermediate values of n (for suppression of response pattern sidelobes). Thus, the values of $e_n$ of greatest importance are those for intermediate values of n, which fortunately are those for which the approximation is most valid.

The expression presented for $e_n$ has been derived for the case where the N elements 201 have omnidirectional response patterns in order to more easily illustrate the manner of derivation. However, most practical element response patterns have a directional dependence relative to element orientation. Usually, to maintain circular symmetry, each element is oriented so that its peak response is directed radially outward. In this case, the signal received by each element when a plane wave is incident will generally differ in magnitude as well as phase from that received by the other elements. This requires a more complex analysis but leads to a form of solution which also can be treated as if it came from a linear array. To outline the form of the analysis, consider that any element pattern symmetrical about $\theta_p = 0$ can be expressed as a summation of $\cos \gamma\theta_p$ terms (a Fourier series representation), and that the $\cos \gamma\theta_p$ itself is the sum of two exponential terms, i.e.:

$$\cos \gamma\theta_p = \tfrac{1}{2}[\exp(j\gamma\theta_p) + \exp(-j\gamma\theta_p)]$$

Now, by an analysis similar to that already presented, it can be shown that for an exponential element angular response pattern, $\exp(j\gamma\theta_p)$, the signals $e_n$ output by the Butler matrix are given by the summation:

$$e_n = \sqrt{N} \exp j\left(\omega_s t - \gamma \frac{\pi}{2}\right) \sum_{\substack{q=-\infty \\ u-\gamma}}^{q=\infty} J(r)\exp(-ju(\theta - \pi/2))$$

for $u = qN - (n - A)$

For response patterns which are sums of such exponentials, the signals, $e_n$, output by RF Butler matrix 203 are obtained by linear superposition of the individual outputs from each of the exponential terms. For example, suppose that the angular response pattern of each element 201 is a cardioid, i.e., that it is given by the expression $(1 + \cos \theta_p)/2$. This response pattern can be represented by three terms; a constant and two exponentials. The outputs from RF Butler matrix 203 for this case are given by:

$$e_n = \tfrac{1}{2} \sqrt{N} \exp(j\omega_s t) \sum_{q=-\infty}^{\infty} [J_u(r) -$$

$$\tfrac{1}{2} jJ(r) - J(r)\underset{u+1}{} ] \exp\left(-ju\left(\theta - \frac{\pi}{2}\right)\right) =$$

-continued $$\tfrac{1}{2} \sqrt{N} \exp(j\omega_s t) \sum_{q=-\infty}^{\infty} [(1 + ju/r)J_u(r) -$$

$$jJ(r)]\exp\left[-ju\left(\theta - \frac{\pi}{2}\right)\right]$$
$$u-1$$

for $u = qN - (n - A)$

Once again making the selection $A = N/2$ and $N \geq 8$, $e_n$ can be approximated by principal terms; i.e., $$e_n \approx \tfrac{1}{2} \sqrt{N}[(1 + j(N/2 - n)/r) \underset{(N/2-n)}{J(r)} -$$

$$\underset{(N/2-n-1)}{jJ(n)} ]\exp j\left[\omega_s t - (N/2 - n)\left(\theta - \frac{\pi}{2}\right)\right] \approx$$

$$\sqrt{N} \, K(N/2 - n,r)\exp j\left[\omega_s t - (N/2 - n)\left(\theta - \frac{\pi}{2}\right)\right]$$

where K is a complex quantity dependent on $(N/2-n)$ and on r, but independent of $\theta$. Note that if the phase offsets represented by the arguments of K are removed by use of appropriate delay lines or phase shifts (called focusing, the function provided by the fixed phase shifts 205), then the resulting signals, $e'_n$, have phase angles which are linearly dependent on $(N/2-n)\theta$, just as in the first case discussed (where the elements were omnidirectional). Note, too, that the amplitude weighting represented by the magnitude K can be readjusted by the set of differential amplitude weights 206 (differential attenuators or amplifiers) to provide a low sidelobe response pattern, or readjusted to provide uniform values of $e_n$ (no weighting) for achieving maximum gain.

To facilitate further explanations, assume that amplitude weights 206 are adjusted differentially to remove the K amplitude weighting and thus remove the dependence of K on $(N/2-n)$. Also assume that the fixed phase shifters remove the term $(N/2-n)\pi/2$ to yield a modified $e'_n$ as follows:

$$e'_n = \sqrt{N} \, G_1 \exp j[\omega_s t - (N/2 - n)\theta]$$

where $G_1$ is a scalar gain factor attributable to the amplitude weighting.

These signals are applied to the mixers 210. Also applied to the mixers are a set of coherently related local oscillator (LO) signals. These are generated by the comb local oscillator 213. Each LO signal differs in frequency by integer multiples of a constant frequency offset, $\omega_1$. The LO signals are coherent in the sense that once every cycle of the offset frequency, all of the LO signals reach the peak of their positive half cycles simultaneously. Numerically, the nth LO frequency is given by:

$$\omega_{LO} = \bar{\omega}_{LO} + (n - \bar{n})\omega_1$$

where $\bar{\omega}_{LO}$ is the average LO frequency. Because of the progressive frequency difference, the LO signals exhibit a time-varying phase advance, $\phi_{LO} = (n - \bar{n})\omega_1 t$.

The IF signals produced by the mixers are progressively phased in accordance with the difference of RF and LO progressive phasing, as may be noted from the following expression for the IF signal.

$$e_{IF} = \sqrt{N}\, G_1 G_2 \exp j\left[\bar{\omega}_{IF} t - (n - \bar{n})\omega_1 t + \left(n - \bar{n} - \frac{1}{2}\right)\theta\right]$$

where $\bar{\omega}_{IF} = \omega_S - \bar{\omega}_{LO}$ and $G_2$ is a scalar gain factor attributable to the conversion loss of the mixer. Thus, the outputs of the mixers are a set of equal amplitude IF signals having a phase progression that is linear with n and with time. This heterodyne technique, using a comb local oscillator 213 and mixers 209, provides a means to differentially phase shift the signals at extremely rapid rates, which as will be shown later, provides the means for extremely rapid beam scanning. Indeed, phase shift rates exceeding $4\pi$ radians per cycle of the highest frequency present in the information content of the incident electromagnetic wave are possible with this technique, thus permitting the array to obtain Nyquist samples while scanning.

The outputs of the mixers 209 are applied to the inputs of the IF Butler matrix 215 which, as will be shown, provides the means to form N beams of sensitivity. The IF Butler matrix divides the signal at its nth input into N equal parts, phase shifts each by an amount, $\phi_{nm}$ and combines each with signals which originated from other ports to form the sum, $e_m$, at its mth output. The phase shift, $\phi_{nm}$ is dependent on both n and m and is given by $$\phi_{nm} = (n - \bar{n})(m - \bar{n})\frac{2\pi}{N}, \; (\phi_{nm} \text{ is modulo } 2\pi)$$

Thus, the output voltage, $e_m$, is the summation:

$$e_m = G_1 G_2 \sum_{n=1}^{n=N} \exp\left[\bar{\omega}_{IF} t - (n - \bar{n})\omega_1 t + \left(n - \bar{n} - \frac{1}{2}\right)\theta - (n - \bar{n})(m - \bar{n})2\pi/N\right]$$

It can be shown that this summation equates to the form:

$$e_m = E_m \exp\left[\bar{\omega}_{IF} t - \frac{\theta}{2}\right]$$

where:

$$E_m = \frac{\sin(\frac{1}{2}NX_m)}{\sin(\frac{1}{2}X_m)}, \; X_m = (\theta - \omega_1 t) + (m - \bar{n})\frac{2\pi}{N}$$

It may be noted from these expressions that each IF Butler matrix output, $e_m$ is the product of an envelope term, $E_m$ and a carrier term. The envelope magnitude is a periodic function of $X_m$, having a principal mainlobe and sidelobes for $X_m$ within its principal range.

The directional dependence of $E_m$ could be illustrated by holding t constant and for each value of m, plotting $E_m$ as $\theta$ is varied over the range from $-\pi$ to $+\pi$. The result would be a family of curves, each having a mainlobe and sidelobes, each identical to the previous curve but displaced in $\theta$ by $2\pi/N$. Taken together, the curves form a contiguous set of main beams which provide near peak response for all values of $\theta$; thus the set of IF Butler matrix outputs, $e_m$, correspond to a set of contiguous beams of sensitivity which together span the entire coverage space.

The time dependence of $E_m$ could be illustrated by holding $\theta$ constant, and for each value of m, plotting $E_m$ as it is varied from 0 to $2\pi/\omega_1$ (the scan period). The result would be a family of curves, each having a mainlobe and sidelobes and each identical to the previous curve but displaced in time by $2\pi/(N\omega_1)$. Taken together, these curves form a contiguous set of responses which provide near peak response for all values of time; thus the set of IF Butler matrix outputs, $e_m$, also correspond to the responses of an N beam antenna whose beams are being scanned past the direction of an emitter in sequence, smoothly in time.

Each of the beams is only on target for 1/N of the scan period. Thus, each beam samples only 1/Nth the signal energy available at the radiators. However, all the beams, taken together, sample all the signal energy. To get all the energy at a single output requires that the multiple time-sequenced outputs of the Butler matrix can be coherently summed. That in turn requires that both the carriers and envelopes of these outputs be brought into phase unison.

In the system shown in FIG. 2, the delay lines 217, 218 and 219 are configured to progressively delay the envelopes by the amount $T_m$, where:

$$T_m = \left(\frac{m - \bar{n}}{\omega_1}\right)\left(\frac{2\pi}{N}\right) + \text{an arbitrary constant} \quad (3)$$

The delay operation causes all the envelopes to peak at the same time. However, this delay operation causes the phase of each carrier to be displaced by several cycles from that of the other carriers, the exact amount of displacement being a linear function of $\bar{\omega}_{IF}$. Periodically, over the $\bar{\omega}_{IF}$ frequency band, the carrier phases will be an integral multiple of $2\pi$ radians apart and thus, effectively cophasal. For signals which produce these values of $\bar{\omega}_{IF}$, the outputs of the delay lines may be coherently summed to obtain all the available signal energy. For other frequencies, the carriers will be in various states of partial or complete destructive interference and so if summed would combine to values less than the peak value. To coherently sum the delay line outputs for these other frequencies would require the addition of progressively increasing phase offsets to each of the signals prior to summing. Just such a task is performed by the second IF Butler matrix 221 of the system shown in FIG. 2. This Butler matrix is identical to the first one 215; indeed, Butler matrix 221 divides the signal at its mth input into N equal parts, phase shifts each by an amount of $0^1{}_B$ (where $\phi^1{}_B = (l - \bar{n})(m - \bar{n})(2\pi/N)$ and combines each with signals which originated from other input ports to form the sum $e_l$ at its lth output. Mathematically, the output voltage $e_l$ is of the form:

$$e_l = E_l \exp\left(\bar{\omega}_{IF} t - \frac{\theta}{2}\right)$$

where:

$$E_l = \frac{\sin(\frac{1}{2}NX)}{\sin(\frac{1}{2}X)} \cdot \frac{\sin(\frac{1}{2}NY_l)}{\sin(\frac{1}{2}Y_l)},$$

$$X = (\theta - \omega_1 t)$$

$$Y_l = \frac{2\pi}{N}\left[\frac{\bar{\omega}_{IF}}{\omega_1} - (l - \bar{n})\right]$$

The function $e_l$ is the product of a carrier term and a doubly-modulated envelope term E. The first factor in the envelope term is similar to the one which modulates $e_m$. The drawings and specification of Ser. No. 700,115 referenced above shows that the beam-scanning action manifest in the outputs of the first IF Butler matrix 215 is also manifest in the outputs of the second IF Butler matrix 221. Also shown is the periodic compressed pulse nature of the output signal, the time domain response being a replica of the dynamic antenna pattern. In a practical system where rejection band response must be suppressed by amplitude tapering of the signals emerging from the Butler matrix (the tapering operation to control frequency sidelobes is decoupled from the tapering operation to control time of angle-of-arrival sidelobes). The filtering is a result of phase cancellations rather than the frequency responses of the components (which are wideband). The width of each passband measured between nulls is $4\pi/N$ in terms of $Y_l$ which translates to $2107_1$ in terms of $\bar{\omega}_{IF}$. The width measured between points that are 3.9 dB down on the frequency envelope is $2\pi/N$ in terms of $Y_l$ which translates to $\omega_1$ in terms of $\bar{\omega}_{IF}$. This bandwidth expresses the range that the average frequency of the IF signal might have if it is to be passed to a particular port of second IF Butler matrix 221 and, as such, specifies the range over which the incident RF signal frequency might vary for reception at that port. It should be distinguished from the instantaneous bandwidth of the IF signal at that port which is $N \omega_1$ (in the case of an incident signal that is CW or of bandwidth small compared to $N \omega_1$). The separation of the passbands is $2\pi$ in terms of the $Y_l$ which translates to $N \omega_1$ in terms of $\bar{\omega}_{IF}$.

An incident signal whose frequency is such that the signal does not cause peak response at a particular port of second IF Butler matrix 221 will also be received at one or more additional ports. Indeed, the N outputs of this second IF Butler network have the staggered frequency responses represented by the frequency envelope magnitudes plotted in FIG. 8 for the case where N=4 in Ser. No. 700,115. Four curves are plotted using different line codes, one for each of the four outputs. Only the mainlobes 801, 802, 803, 804 and grating lobes 805, 806, 807, 808, 809 and 810 are shown; the sidelobes have been suppressed for purposes of clarity. Adjacent mainlobes are spaced apart by $\omega_1$ in terms of $\bar{\omega}_{IF}$, and so crossover at points that are 3.9 dB down from the mainlobe peaks (for the case shown, i.e., a case in which there is no amplitude tapering). Taken together, the four curves form a continuum of responses in frequency so that all signals will be received; yet signals at closely spaced frequencies will be separated and will appear at different outputs.

The magnitude, $|E_l|$ of the double modulated envelope of $e_l$ is plotted in a three dimensional graph in FIG. 9 of Ser. No. 700,115 for the case where N=4. In this figure $|E_l|$ (normalized signal response) is plotted against the Z axis versus both normalized intermediate frequency (Y-axis) and time-encoded direction-of-arrival (X-axis). The range of the Y-axis has been translated by $Y_o$ so that $Y - Y_o = 0$ corresponds to the midband value of $\bar{\omega}_{IF}$, and this midband value has been chosen so that it is an integer multiple of $N \omega_1$. Four major lobes are shown within the range of the plot. The lobe 901 at (0, 0) depicts the change in response as signal frequency (Y variable) is shifted from its midband value, or as time passes (X variable) from its starting value. Since this lobe represents a nominal benchmark in frequency and time it will be designated the mainlobe. The plot shows that as signal frequency is shifted from its midband value, the response will follow the mainlobe pattern, eventually dropping to zero. Further shift in frequency will cause minor response (sidelobes 902, 903). Still further shifts in frequency will cause another major response in accordance with the pattern of a grating lobe 904. Similarly as time is shifted from its initial value (with frequency fixed at the midband value) the response will follow the mainlobe pattern eventually dropping to zero. Further shift in time will cause minor responses (sidelobes 905,906). Still further shift in time will cause another major response in accordance with the pattern of a grating lobe 907. The reduced response all around each major response illustrates graphically in Ser. No. 700,115 how a signal response is simultaneously isolated in two dimensions. Such isolation is the first step in the process of obtaining joint resolution of signals in both the frequency and the spatial domains. The second and final step is the removal of ambiguities resulting from the grating lobe responses. The grating lobes in the time dimension (X axis) correspond to subsequent scan cycles rather than ambiguities if the antenna element spacing is made sufficiently close. The grating lobes in the frequency dimension (Y axis) can be eliminated by coarse frequency filtering. Precisely this function is provided by the coarse channelization filters 223 in FIG. 2 of the present invention. These filters divide the frequency coverage band into contiguous passbands, each of which is $N \omega_1$ wide and centered about a single major frequency response lobe of $E_l$. Thus, if two signals were incident simultaneously from nearly the same direction but were separated by more than $\omega_1$ in frequency, they would be unambiguously resolved, peaking at different output ports 224. Similarly, if two signals having nearly the same frequency were incident simultaneously from directions separated by more than $(2/N)$ in $\sin \theta$ space (half-wave antenna element spacing) they would be unambiguously resolved, peaking at different times at a single output port of the set 224. Also, by using pulse compression to accomplish this time multiplexing, the present invention preserves the inherent separation of two signals incident at two different times. Thus, multiple signals which arrive at the output ports 224 of the coarse channelizers are unambiguously resolved in frequency, direction and time.

The number of individual filters required at each coarse channelizer is equal to $\omega_T/(N \omega_1)$ where $\omega_T$ is the total frequency coverage bandwidth. Since there are N coarse channelizers, the total number of filters is $\omega_T/\omega_1$ which is the same number that are required in a single conventional channelized receiver providing simultaneous coverage of $\omega_T$ and a channel bandwidth of $\omega_1$. However, the channelization filters in the present invention have N times the bandwidth and so may be implemented at an IF frequency which is N times as high as that used in the conventional channelized receiver. This would permit the receiver of the present invention to have as much as N times the simultaneous frequency coverage as is possible with the conventional channelized receiver.

It is next of interest to compare the signal-to-noise ratio at the outputs 224 of the present invention to that available from a reference system, the prior art system described in FIG. 1 subject to the same incident wavefront. It will be assumed that dissipation losses occurring after front-end noise is introduced are zero since these losses have the same effect on both noise and signal and thus do not affect the signal-to-noise ratio. The peak value of signal power at an output 224 (effectively, the peak value of $e_f^2$) is $N^2$ times the signal power output by the reference system (effectively $e_{IF}^2$). The noise power output can be derived by consideration of how noise power is distributed through the system of FIG. 2. The mixers 209, 210 and 211 act independently to generate the primary source of noise. Their noise is applied to the first IF Butler matrix 215 which both divides the noise input into N equal parts distributing each part to N outputs, and also sums the divided noise from each of its N inputs at every one of its outputs. Since the noise power is additive (the noise components at any one output being uncorrelated) the noise power at any output of the first IF Butler matrix 215 is equal in value to that applied to any of its inputs by a single mixer. The delay lines 217, 218 and 219 destroy any correlation between the N noise outputs of the first IF Butler matrix 215 so that the action of the second IF Butler matrix 221 on the noise is a repeat of the process performed by the first matrix. Therefore, the noise power at any output of the second IF Butler matrix 221 is also equal in value to that output by a single mixer. As a result, the signal-to-noise ratio at any output of the second IF Butler matrix is $N^2$ better than that of the reference system. Further improvement in signal-to-noise ratio is obtained at the outputs of the coarse channelizers since the noise power is further divided by the number of channels, $\omega_T/(N \omega_1)$, while the signal remains essentially undivided. Thus, the signal-to-noise ratio at an output of the channelizer 224 is approximately a factor of $N \omega_T/\omega_1$ better than that of the reference system. At this point, it should be noted that in some applications, receivers are not required to be wide-open in frequency. For these applications, the output of the reference system could be augmented by a narrow-band filter to reduce noise. The bandwidth of this filter cannot be narrower than the spectrum of the signal to be received. Since $\omega_1$ in the system of the invention must also be at least as wide as that spectrum, the value of $\omega_1$ might be considered for the bandwidth of the output filter in this augmented reference system. That would improve the signal-to-noise ratio of the augmented reference system by the factor $\omega_T/\omega_1$. Therefore, for these narrow band applications, the signal-to-noise ratio at the output 224 of the current invention would be a factor of N better than that of the augmented reference system. The improvement in sensitivity, in effect, removes the loss due to sampling that degrades the performance of the references system.

Thus, it is seen from the description above that the cylindrical phased array is comprised of the means to decompose the distribution of current on the radiator elements caused by wave incidence into component signals which are the Fourier spatial harmonics of the distribution, heterodyne means to differentially phase shift these component signals at rates exceeding $4\pi$ radians per cycle of the highest frequency present in the information content of the incident wave, and means to form multiple complexweighted sums of the component signals. The sums are multiple time sequenced responses, each response corresponding to a different beam of sensitivity. The beams together with each other form a contiguous set that both fill all azimuths at any one time and also synchronously scan all azimuths. The beams are differentially delayed to permit the beam responses from any particular incident signal to be added in unison, giving rise to a compressed pulse whose time of occurrence is related to the signal angle of incidence. The means for beam addition selectively forms a coherent sum at only one of its multiplicity of output ports, the particular port being a periodic function of the signal frequency. The ambiguities which arise in frequency resolution and frequency measurement due to this periodicity are solved by coarse-resolution frequency channelizers. In effect the new invention, retains the angle independent wide-open reception characteristics of an omni antenna, while exhibiting the gain and angular resolution of a multi-beam phased array antenna and the frequency resolution of a fine resolution channelized receiver.

Alternative equivalent systems are considered within the scope of the invention. For example, alternative systems derived by the addition of a set of amplifiers prior to the mixing process or after the mixing process or the addition of preselector filters or attenuators or receive/transmit duplexers or any other set of devices normally found in the front end of a receiver are considered within the contemplations of the current invention because these devices do not alter the intent or the manner of operation of the invention, although to the extent that the transmission parameters of such devices fail to track each other, they can degrade performance.

All of the alternative equivalent forms of the invention have in common the following essence of the invention; the means to form multiple, time-sequenced outputs, each output corresponding to a different beam of sensitivity which scans the full coverage sector and together with the other outputs forms a contiguous set of such beams which both fill the coverage sector at any one time and scan the full coverage synchronously as a function of time; the means to differentially delay the time-sequenced outputs corresponding to an emitter at a fixed direction, so that the modulation envelopes of these outputs occur in unison; the means to coherently combine the time-aligned outputs selectively at different output ports for different emitter frequencies; and the means to separate multiple outputs at a single output port from emitters having frequencies corresponding to grating lobe responses. Although an azimuth plane is used for reference purposes, the present invention is capable of functioning in the same manner regardless of the plane in which the antenna elements lie.

While in accordance with the patent statutes, only the best mode and preferred embodiment of the present invention has been presented in detail, for the true scope and breadth of the invention, reference should be had to the appended claims.

What is claimed is:

1. An apparatus capable of adding the features of separating multiple signals and for eliminating sampling loss of signal energy in antenna systems having an azimuth coverage sector through which the antenna system scans at a rate that is faster than the rate at which information is being received, comprising:

(a) a cylindrical phased array antenna comprising a plurality of radiator elements evenly spaced around a circular arc;

(b) means for decomposing the current distribution on the radiator elements caused by electromagnetic wave incidence into component signals being Fourier spatial harmonics of the distribution wherein said component signals have amplitudes corresponding to the incident electromagnetic wave;

(c) means for forming a plurality of beams of sensitivity from said component signals, said plurality of beams of sensitivity being equal in number to said plurality of radiator elements in said circular arc, the beams being contiguous and considered as lying in the azimuth plane of an emitter for reference purposes, with each beam being generally evenly spaced from adjacent beams in $\theta$ spaced, where $\theta$ is the angle away from broadside in the azimuthal plane, wherein the spacing between beam center directions in $\theta$ space is generally proportional to the reciprocal of the number of antenna elements, and the beams, taken together to form a larger composite beam, span the entire azimuth coverage sector of said antenna system;

(d) means to differentially weight said amplitude of said component signals to achieve a desired time invariant relative weighing of the signals for beam shape control;

(e) means to differentially delay and phase shift said component signals to achieve a desired time invariant relative phasing of the signals for beam focusing;

(f) means to differentially phase shift these component signals at rates exceeding $4\pi$ radians per cycle of the highest frequency present in the information content of said incident electromagnetic wave for synchronously scanning each of the beams over the entire coverage sector, the beams maintaining their relative positions adjacent one another in 0 space during scanning, the scanning being carried out periodically at a rate that is at least twice as fast as the highest information rate being received;

(g) means for accepting signals received by each beam and differentially delaying said signals to cause their modulation envelopes to respond in unison to a single emitting source at a particular azimuth angle;

(h) means for coherently combining said signals after said signals have been differentially delayed, said means for combining being arranged to cause coherent addition selectively at different signal frequencies; and (i) means for separating multiple signals at a single output port of said combiner when said signals have frequencies corresponding to grating lobe response.

2. An apparatus as in claim 1, further comprising:

(a) a real-time discrete Fourier transformer having a number of input ports equal to the number of radiator elements and an equal number of output ports;

(b) said means to differentially weight said amplitude of said component signals comprising a plurality of attenuators, (c) said means to differentially delay and phase shift said component signals comprising a plurality of networks each network consisting of a section which provides nondispersive delay and a section which provides differential phase shift which is constant with frequency;

(d) said means to differentially phase shift said component signals linearly versus time comprising a number of heterodyne mixers equal to the number of output ports of the Fourier transformer, and means for generating a number of local oscillator signals equal to the number of mixers, the frequency of each local oscillator signal being offset from that of the preceding one so that the frequency from the first to the last of the signals form a linear arithmetic progression with a common difference equal to the beam scanning rate, the means for generating the local oscillator signals producing signals which are coherently related so that at the same point in each cycle of the common difference frequency, the sinusoidal variations of the local oscillator signals will simultaneously reach their peaks;

(e) said means for forming a plurality of beams comprising an intermediate frequency beam-forming network having a plurality of input ports equal to the number of mixers with each of said input ports being coupled to a separate output port of one of said mixers, and said intermediate beam-forming network having a plurality of output ports equal to the number of beams;

(f) said means for differentially delaying a plurality of signals comprising a plurality of delay lines equal in number to the number of beams, each delay line being designated by the same number as the beam-forming network output port to which it is coupled, the delay of each delay line being offset from that of the preceding one in the order of its arithmetic designation to order the delays of the delay lines from the first to the last in a linear arithmetic progression with a common difference equal to the reciprocal of the product of the number of beams times the beam scanning rate; and (g) said means for coherently combining a plurality of signals comprising a second intermediate-frequency beam-forming network having a plurality of input ports equal to the number of delay lines, with each of said input ports being coupled to a separate output port of one of said delay lines, and said second intermediate-frequency beam-forming network having a plurality of output ports equal to its number of input ports; and (h) said means for separating multiple signals comprising a plurality of frequency channelizers equal to the number of output ports of said second intermediate-frequency beam-forming network, each channelizer having an input port and a plurality of output ports equal in number to the integer value of the quotient of the quantities, overall frequency coverage bandwidth divided by the bandwidth of each channel, said channel bandwidth being generally equal to the product of the number of antenna elements times the beam scanning rate, with each said input port of each channelizer being coupled to an output port of said second intermediate-frequency beam-forming network.

3. A process for eliminating the sampling loss of signal energy in antenna systems having an azimuth coverage sector through which the antenna system scans at a rate that is faster than the information rate being received, comprising the steps of:

(a) providing a cylindrical phased array antenna comprising a plurality of radiator elements evenly spaced around a circular arc;

(b) decomposing the current distribution on the radiator elements caused by electromagnetic wave incidence into component signals being Fourier spatial harmonics of the distribution and having an amplitude dependent upon the incident electromagnetic wave;

(c) forming a plurality of beams of sensitivity from said component signals, said plurality of beams of sensitivity being equal in number to said plurality of radiator elements in said circular arc, the beams being contiguous and considered as lying in the azimuth plane of an emitter for reference purposes, with each beam being generally evenly spaced from adjacent beams in 0 spaced, where 0 is the angle away from broadside in the azimuthal plane, wherein the spacing between beam center directions in $\theta$ space is generally proportional to the reciprocal of the number of antenna elements, and the beams, taken together to form a larger composite beam, span the entire azimuth coverage sector of said antenna;

(d) differentially weighting said amplitude of said component signals to achieve a desired time invariant relative weighting of the signals for beam shape control;

(e) differentially delaying and phase shifting said component signals to achieve a desired time invariant relative phasing of the signals for beam focusing;

(f) differentially phase shifting these component signals at rates exceeding $4\pi$ radians per cycle of the highest frequency present in the information content of said incident electromagnetic wave for synchronously scanning each of the beams over the entire coverage sector, while maintaining the beams in their relative positions adjacent one another in 0 space during scanning, the scanning being carried out periodically at a rate that is at least twice as fast as the highest information rate being received;

(g) accepting signals received by each beam and differentially delaying said signals to cause their modulation envelopes to respond in unison to a single emitting source at a particular azimuth angle;

(h) providing means for coherently combining said signals after said signals have been differentially delayed, said means for combining being arranged to cause coherent addition selectively at different output ports of said combiner for different signal frequencies; and (i) providing means for separating multiple signals at a single output port of said combiner when said signals have frequencies corresponding to grating lobe responses.

* * * * *